(Model.)

J. HUNT.
COUPLING ATTACHMENT FOR SMOOTH FAUCETS.

No. 249,766.             Patented Nov. 22, 1881.

WITNESSES:
Albert Lupton
Hm. McCombs.

INVENTOR,
James Hunt.

UNITED STATES PATENT OFFICE.

JAMES HUNT, OF PHILADELPHIA, PENNSYLVANIA, ASSIGNOR OF ONE-HALF TO BENNET C. WILSON, OF SAME PLACE.

COUPLING ATTACHMENT FOR SMOOTH FAUCETS.

SPECIFICATION forming part of Letters Patent No. 249,766, dated November 22, 1881.

Application filed March 30, 1881. (Model.)

*To all whom it may concern:*

Be it known that I, JAMES HUNT, a citizen of the United States, resident of the city of Philadelphia, in the county of Philadelphia and State of Pennsylvania, have made certain new and useful Improvements in Coupling Attachments for Smooth Faucets, of which the following is a specification, reference being had to the annexed drawings, wherein—

Figure 1:
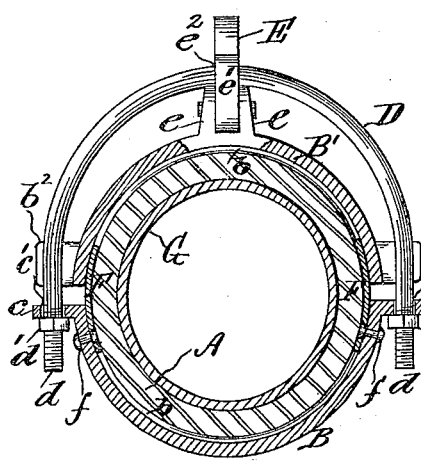
Figure 2:
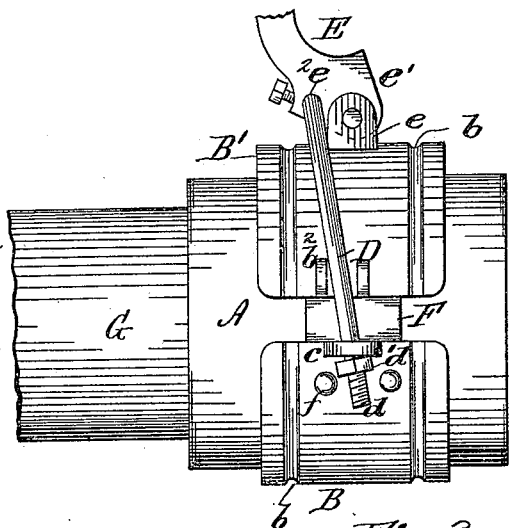
Figure 3:
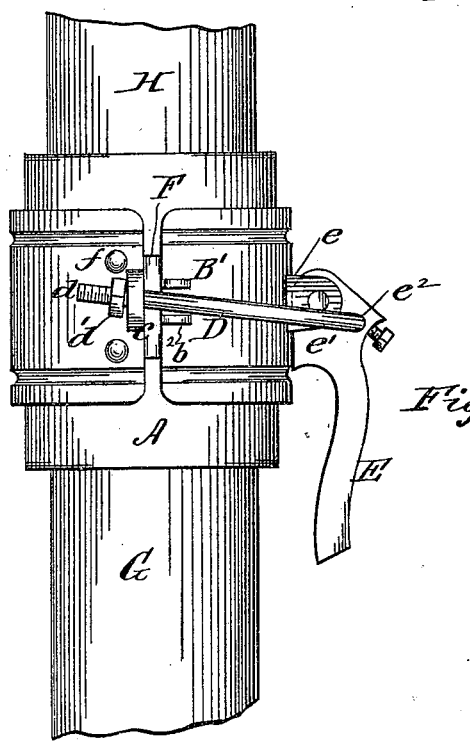

Figure 1 is a transverse section of my improved coupling device. Fig. 2 is a side elevation of the same, represented in a loosened or uncoupled condition. Fig. 3 is a like view, representing the coupling attachment locked in position to form a joint between the smooth ends of two juxtaposed pipes.

My invention has for its object to provide a coupling attachment for connecting pipe ends to smooth faucets or to other pipes having smooth or unthreaded ends; and my invention consists in the combination, with a rubber or other elastic tube or union, of two approximately semicircular clamps loosely connected together by a bail passing through one of said clamps and through a cam-lever pivoted to the other clamp, so that manipulation of said lever in one direction operates the clamps to provide a coupling which is automatically locked in position by said bail, and when said lever is operated in a reverse direction said clamps are unloosed or uncoupled to permit of the disengagement of the coupled pipe ends.

Referring to the accompanying drawings, A represents a section of pipe or a union made of rubber or other suitable elastic material.

B B' are two metallic semicircular clamps, formed concentric to and embracing the pipe or union A. Said clamps are each provided with internal ribs or ridges, $b\ b$, which impinge upon and embed themselves in said union A when pressure is applied to said clamps. The clamp B is provided with ears or lugs $c\ c$ at its ends, having openings $c'\ c'$ formed therein, through which pass the ends $d\ d$ of bail D. Said ends are threaded, as shown, and are provided each with a nut, $d'\ d'$.

$e\ e$ are lugs formed on the clamp B', between which, and having pivotal bearings therein, is a lever, E, said lever having a cam end, $e'$, in which is an opening, $e^2$, through which the bail D passes, to connect said clamps B and B' loosely together.

F F are flaps or wings, riveted at $f\ f$ to clamp B between its ridges, and extend into and pass between the ridges of the clamp B', thereby forming or providing for a continuous ring or annular clamp for exerting an impingement at all points around the union A when pressure is applied to said clamps.

The operation is as follows: The pipe G, being designed to be coupled to the smooth end H of a faucet or other pipe end, the union A, with clamps B B' in position thereon, is slipped half-way over the end of said pipe G, and the end of the latter is juxtaposed to the end of pipe H, the remaining half of union A then encircling pipe H, the clamps B B' being in position immediately over the joint of said pipe ends. The lever E being depressed, the bail D is raised to draw the clamps B and B' together, their ridges $b\ b$ sinking into the union A to form or make a tight coupling for said pipe ends. As said bail is raised it is also moved laterally over the pivotal connection of lever E, as shown in Fig. 3, and thereby locks said lever in its adjusted position, to prevent the same being accidentally turned up to loosen the coupling attachment from its bearings.

The amount of pressure exerted by cam-lever E is regulated by adjusting the nuts $d'\ d'$ upon the ends of the bail D, said adjustment being made before the pipes are placed in position to be coupled together; or it may be done after the union A is placed upon said pipes. Such adjustment of the length of the bail D also provides for using one size of coupling for various diameters of pipes.

If desired, in lieu of using the threaded end bail, the latter may be a ring, in which case both of the clamps are provided with cam-levers, through which said ring will pass in a manner substantially as shown and described for lever E, thereby providing for a double pressure upon said union A, the adjustment of one of said levers taking up the slack of said clamps, and the manipulation of the other lever exerting the requisite pressure to cause said clamps to form the coupling-joint.

If desired, the clamp B may be provided with lugs $b^2$ $b^2$ on either side of the bail D, to prevent the latter from moving laterally a greater extent than suffices for the movement of the cam-lever E, said lugs thereby causing said bail to act to keep the clamps B B' in line with each other when they are in an uncoupled condition, as plainly shown in Fig. 2.

What I claim as my invention is—

1. In combination with a rubber or elastic union, A, the clamps B B', bail D, and lever E, said parts being arranged for operation substantially as shown and described.

2. In combination with a rubber or elastic union, A, the clamps B B', provided respectively with lugs $c$ and $e$, bail D, having threaded ends $d$ and nuts $d'$, and lever E, pivoted in lugs $e$, and having connection with said bail, substantially as shown and described.

3. In combination with a rubber or elastic union, A, the clamps B B', provided respectively with lugs $c$ and $e$, and bail D, having threaded ends $d$ and nuts $d'$, and passing between lugs $b^2$ $b^2$ on clamp B, substantially as shown and described.

4. In a coupling device for smooth faucets and other pipe ends, the combination, with an elastic tube-section or union, of two clamps connected together by a bail which passes through a cam-lever secured to one of said clamps, substantially as shown and described.

5. In a coupling device, the combination, with a rubber union or hose-section, of two metallic clamping-pieces connected by a bail having threaded ends passing through openings in lugs formed on one of said clamps, the other clamp having a pivoted cam-lever, through which said bail passes, substantially as shown and described.

In testimony that I claim the foregoing I have hereunto set my hand this 26th day of March, 1881.

JAMES HUNT.

Witnesses:
CHAS. C. SCHERF,
ALBERT LUPTON.